United States Patent
Bricaud et al.

(10) Patent No.: US 10,883,778 B2
(45) Date of Patent: Jan. 5, 2021

(54) HEAT EXCHANGER FOR A GAS TURBINE ENGINE

(71) Applicant: ANSALDO ENERGIA SWITZERLAND AG, Baden (CH)

(72) Inventors: Cyrille Bricaud, Rheinfelden (DE); Daniel Ponca, Zurich (CH); Stephan Strueken, Zurich (CH); Marcos Escudero Olano, Zurich (CH)

(73) Assignee: Ansaldo Energia Switzerland AG, Baden (CH)

( * ) Notice: Subject to any disclaimer, the term of this patent is extended or adjusted under 35 U.S.C. 154(b) by 243 days.

(21) Appl. No.: 15/884,575

(22) Filed: Jan. 31, 2018

(65) Prior Publication Data
US 2018/0216901 A1     Aug. 2, 2018

(30) Foreign Application Priority Data
Jan. 31, 2017  (EP) .................... 17154084

(51) Int. Cl.
| | |
|---|---|
| F28F 19/01 | (2006.01) |
| F02C 7/052 | (2006.01) |
| F02C 7/18 | (2006.01) |
| F28D 7/16 | (2006.01) |
| F02C 7/141 | (2006.01) |

(52) U.S. Cl.
CPC ............. *F28F 19/01* (2013.01); *F02C 7/052* (2013.01); *F02C 7/141* (2013.01); *F02C 7/185* (2013.01); *F28D 7/16* (2013.01); *F05D 2260/213* (2013.01); *F05D 2260/607* (2013.01)

(58) Field of Classification Search
CPC ........... F28F 19/01; F02C 7/141; F02C 7/185; F25D 7/16; F05D 2260/209; F05D 2260/213; F05D 2260/607
See application file for complete search history.

(56) References Cited

U.S. PATENT DOCUMENTS

| | | | |
|---|---|---|---|
| 2,327,691 A |   | 8/1943 | Allardice |
| 2,786,341 A | * | 3/1957 | Green ...................... F25B 9/04 |
| | | | 62/5 |
| 3,732,920 A |   | 5/1973 | Kimmel |
| 4,220,200 A | * | 9/1980 | Weber .................. F22B 1/1823 |
| | | | 165/142 |
| 5,601,788 A | * | 2/1997 | Hyppanen ............... B01J 8/006 |
| | | | 110/216 |

(Continued)

FOREIGN PATENT DOCUMENTS

| | | |
|---|---|---|
| EP | 1 314 872 A1 | 5/2003 |
| WO | WO 1998/054452 A1 | 12/1998 |

OTHER PUBLICATIONS

Antony Barber, Pneumatic Handbook, pp. 581-589 (Year: 1997).*

(Continued)

*Primary Examiner* — Gerald L Sung
*Assistant Examiner* — Rene D Ford
(74) *Attorney, Agent, or Firm* — Buchanan Ingersoll & Rooney PC

(57) ABSTRACT

A heat exchanger is disclosed which includes a pressure vessel with an inlet for air, an outlet for air, and a bundle of pipes housed within the pressure vessel for a thermo-vector fluid. A gas/solid separator is provided within the pressure vessel for separating particles drawn by the air.

16 Claims, 2 Drawing Sheets

(56) References Cited

U.S. PATENT DOCUMENTS

| | | | | |
|---|---|---|---|---|
| 5,797,259 | A * | 8/1998 | Nielsen | F01K 23/06 60/39.182 |
| 6,792,762 | B1 | 9/2004 | Yamanaka et al. | |
| 6,892,523 | B2 * | 5/2005 | Fetescu | F01K 21/047 261/152 |
| 7,481,265 | B2 * | 1/2009 | Youssef | F22B 1/1838 165/134.1 |
| 8,006,651 | B2 * | 8/2011 | Veitch | F23J 15/06 122/31.1 |
| 8,454,716 | B2 * | 6/2013 | Sedillo | B01D 45/16 55/309 |
| 9,109,513 | B2 * | 8/2015 | Fujita | F02C 6/18 |
| 2009/0282837 | A1 | 11/2009 | Yamanaka et al. | |
| 2014/0298806 | A1 * | 10/2014 | Jeter | F03G 7/04 60/641.2 |

OTHER PUBLICATIONS

Extended European Search Report dated Jul. 18, 2017, by the European Patent Office in the corresponding European Patent Application No. 17154084.2.

* cited by examiner

HEAT EXCHANGER FOR A GAS TURBINE ENGINE

PRIORITY CLAIM

This application claims priority from European Patent Application No. 17154084.2 filed on Jan. 31, 2017, the disclosure of which is incorporated by reference.

TECHNICAL FIELD

The present invention relates to a heat exchanger for a gas turbine engine. The gas turbine engine can be adopted in a power plant.

BACKGROUND

Gas turbine engines are known to comprise a compressor, a combustion chamber and a turbine. In addition, they can also comprise a second combustion chamber (sequential combustion chamber) and a second turbine.

The turbine has a stator and a rotor, which is rotatable within the stator. Between the stator and the rotor a hot gas duct is defined, through which hot gas generated in the combustion chamber passes through. The stator comprises vanes that projects into the hot gas duct and the rotor comprises blades also projecting into the hot gas duct.

During operation air is compressed in the compressor and directed into the combustion chamber where a fuel is injected; compressed air and fuel are combusted in the combustion chamber generating the hot gas that is directed into the turbine, in particular through the hot gas duct.

Since the thermal load on the combustion chamber and on the turbine is very high, a cooling must take place. In particular, in order to cool the turbine, air is extracted from the compressor and is directed into the turbine. In addition, a heat exchanger can be placed between the compressor and the turbine, with the aim of cooling the compressed air coming from the compressor prior to sending it to the turbine to increase cooling efficiency.

Known heat exchangers comprise a pressure vessel having an air inlet, an air outlet and a bundle of pipes for a thermo-vector fluid used for cooling the air; the bundle of pipes housed within the pressure vessel may be serpentine shaped or helical shaped, such as exemplary disclosed in patents U.S. Pat. Nos. 5,797,259 A and 7,481,265 B2.

The problem arising from known heat exchangers is that the compressed air may contain solid particles that can obstruct the cooling holes of the blades and vanes of the turbine, hence preventing a correct cooling and thus causing damaging of the turbine. There is the need of avoiding such inconvenient.

SUMMARY

An aspect of the invention includes providing a heat exchanger for a gas turbine engine that prevents obstruction of the cooling holes of the blades and vanes of the turbine.

These and further aspects are attained by providing a heat exchanger for a gas turbine engine in accordance with the accompanying claims.

Advantageously, the heat exchanger has a compact structure and allows gas/solid separation to occur inside the heat exchanger, allowing to gain space around the turbine area without resulting bulky.

BRIEF DESCRIPTION OF THE DRAWINGS

Further characteristics and advantages will be more apparent from the description of a preferred but non-exclusive embodiment of the heat exchanger, illustrated by way of non-limiting example in the accompanying drawings, in which.

DETAILED DESCRIPTION OF EXEMPLARY EMBODIMENTS

Figure 1:
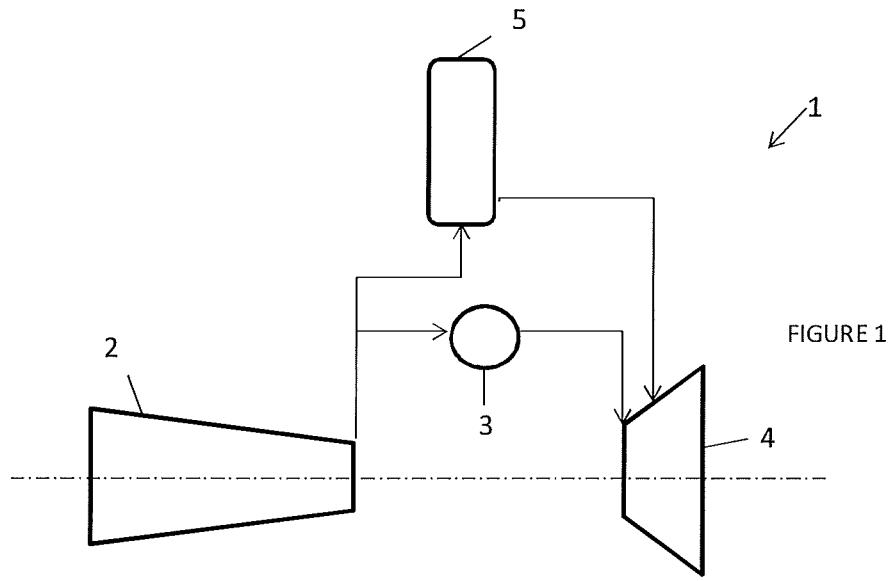
FIG. 1 shows a schematic view of a gas turbine engine comprising a heat exchanger for cooling the compressed air diverted from the compressor and directed into the turbine with cooling purpose.

With reference to the figures, these show a gas turbine engine 1 comprising a compressor 2, a combustion chamber 3 and a turbine 4. A heat exchanger 5 is also provided in the gas turbine engine 1, connected between the compressor 2 and the turbine 4, in order to cool air extracted from the compressor 2 and directed into the turbine 4 for cooling. The gas turbine engine 1 can also have two combustion chambers in sequence with or without a high pressure turbine in between.

The heat exchanger 5 comprises a pressure vessel 6, preferably of cylindrical shape, an inlet 7 and an outlet 8 for a gas, with the gas being typically compressed air from the compressor.

Within the pressure vessel 6 an air path is defined between the inlet 7 and the outlet 8; the air path can either have a single run between the inlet 7 and the outlet 8, and in this case the inlet 7 and the outlet 8 are preferably at opposite parts of the pressure vessel 6, or multiple (e.g. two) runs and in this case the inlet 7 and the outlet 8 can be at the same or different parts of the pressure vessel 6.

A bundle of pipes 9 is housed within the pressure vessel 6 for a thermo-vector fluid such as water, which enters the pressure vessel 6 from a thermo-vector fluid inlet 22 and exits the pressure vessel 6 from a thermo-vector fluid outlet 23.

In the preferred embodiments of the present invention, a gas/solid separator 10 is provided downstream the bundle of pipes 9 with reference to an air flow direction and it is preferably fixed to a wall 11 of the pressure vessel 6.

The gas/solid separator 10 may be provided in any intermediate part of the pressure vessel 6 that is defined between the pressure vessel opposite ends.

Figure 5:
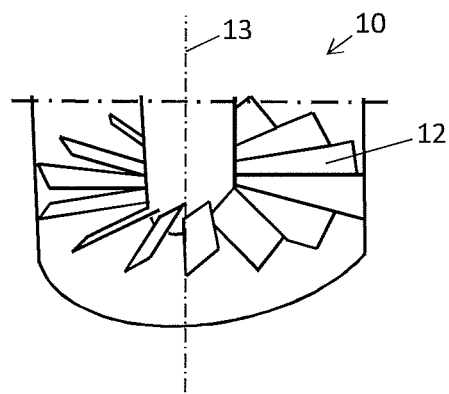
FIG. 5 shows an embodiment of the gas/solid separator.

The gas/solid separator 10 as illustrated in FIG. 5 comprises vanes 12 that are inclined towards the pressure vessel longitudinal axis 13, i.e. they are inclined with reference to a plane perpendicular to the pressure vessel longitudinal axis 13. The vanes 12 are preferably non-rotating vanes but it is clear that can also be rotating vanes; in the latter case, the rotation can be provided by a motor 14 connected to the vanes 12; e.g. the motor 14 can be provided within the pressure vessel 6, as exemplary illustrated in FIG. 4.

Figures 2, 3, 4:
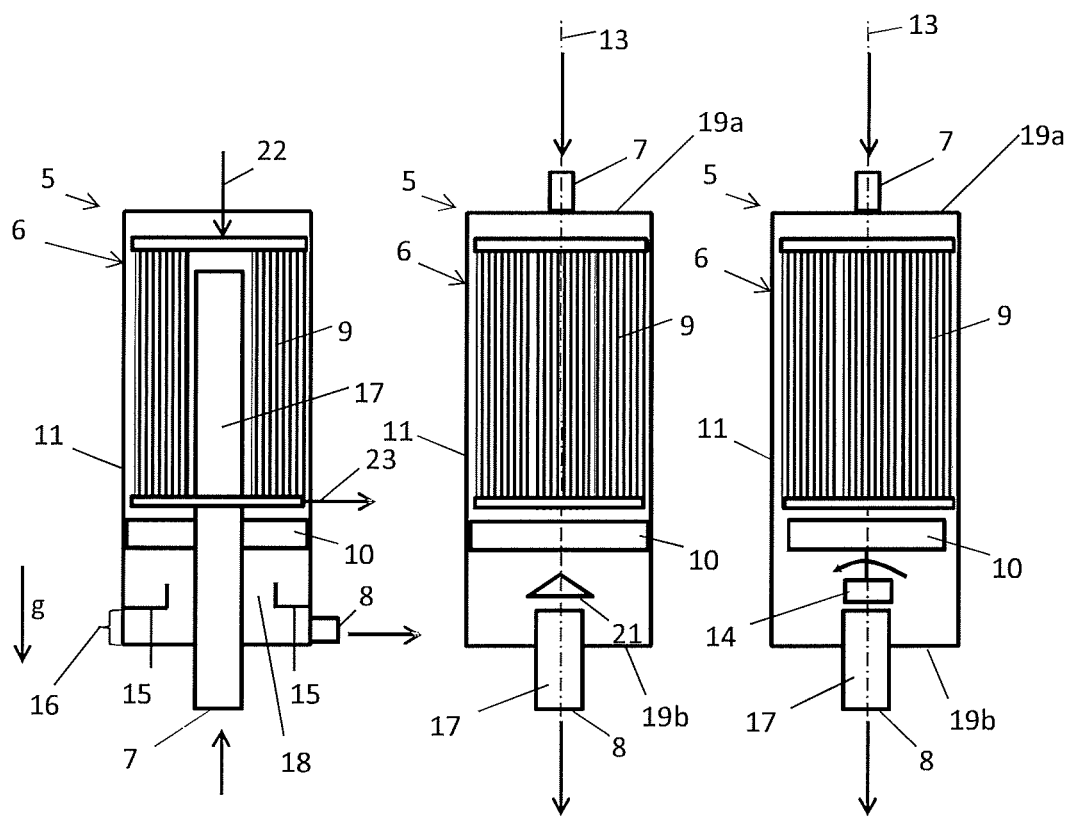
FIG. 2 shows a first embodiment of the heat exchanger.
FIG. 3 shows a second embodiment of the heat exchanger.
FIG. 4 shows a third embodiment of the heat exchanger.

In a first embodiment of the invention shown in FIG. 2, the heat exchanger 5 is provided with a pipe 17 extending along the longitudinal axis 13 and passing between the bundle of pipes 9; the inlet 7 is located at an end of the pipe 17 protruding outside of the pressure vessel 6.

In addition, the pressure vessel 6 comprises a wall 15 at a distance from the bottom of the pressure vessel 6 to define a space 16 located between the wall 15 and the bottom of the pressure vessel 6; the outlet 8 is provided at the space 16.

Between the wall 15 and the pipe 17 it is defined a gap 18 for the air to flow along the pressure vessel 6.

This embodiment allows the air path to have two runs, one run within the pipe 17 and one run outside the pipe 17 and through the gap 18.

The outlet 8 opens at a side of the pressure vessel 6 but it is clear that it could open on different positions, e.g. at the bottom of the pressure vessel 6.

In this embodiment the gas/solid separator 10 can be fixed to the pipe 17 and/or to the wall 11 of the pressure vessel 6.

In a second embodiment of the invention shown in FIG. 3, the pressure vessel 6 comprises a first and a second opposite end 19a and 19b on the longitudinal axis 13. The inlet 7 and the outlet 8 are provided on the first and on the second opposite ends 19a and 19b. This embodiment allows the air path to have one run within the pressure vessel walls 11.

A pipe 17 is provided defining the outlet 8 and partially protruding inside the pressure vessel 6, with an end of the pipe 17 housed within the pressure vessel 6 remaining distant from the vanes 12.

The pipe 17 may be provided with a cover 21.

In a third embodiment of the invention shown in FIG. 4, the vanes 12 can be made to rotate by means of the motor 14; in this case, the gas/solid separator 10 is not fixed to the wall 11 of the pressure vessel 6.

The operation of the heat exchanger is apparent from that described and illustrated and is substantially the following.

When the gas turbine engine 1 is in operation, compressed air is extracted from the compressor 2 and is directed into the heat exchanger 5 and then into the turbine 4.

With reference to the embodiment of FIG. 2, the compressed air enters the heat exchanger 5 through the inlet 7, passes through the pipe 17 (first run) and then externally to the pipe 17 through the bundle of pipes 9 (second run) and cools thanks to the thermo-vector fluid passing through the bundle of pipes 9. As the air flow passes through the gas/solid separator 10, the vanes 12 of the gas/solid separator 10 generate swirl to the air flow that makes the air to rotate; the centrifugal forces generated cause the solid particles that come along with the air flow to separate from the air flow and to be pushed against the wall of the pressure vessel 6 and to fall along the wall of the pressure vessel; reference g identifies the gravity direction. E.g. in the embodiment of FIG. 2, the solid particles gathers on the wall 15, whilst the rotating air passes through the gap 18 and moves out of the pressure vessel 6 via the outlet 8 and is directed to the turbine 4.

The air flowing to the turbine 4 from the heat exchanger 5 is cold, clean from solid particles and the whole process takes place with reduced pressure losses.

The operation of the embodiments shown in FIG. 3 and FIG. 4 is similar to the one described; in particular in these cases the solid particles gather at the bottom of the pressure vessel 6. In addition, in connection with the embodiment of FIG. 4, in case there is the need of increasing gas/solid separation efficiency, the vanes 12 can be made to rotate.

Naturally the features described may be independently provided from one another. For example, the features of each of the attached claims can be applied independently of the features of the other claims.

In practice the materials used and the dimensions can be chosen at will according to requirements and to the state of the art.

REFERENCE NUMBERS

1 GAS TURBINE ENGINE
2 COMPRESSOR
3 COMBUSTION CHAMBER
4 TURBINE
5 HEAT EXCHANGER
6 PRESSURE VESSEL
7 INLET
8 OUTLET
9 BUNDLE OF PIPES
10 GAS/SOLID SEPARATOR
11 PRESSURE VESSEL WALL
12 VANES
13 LONGITUDINAL AXIS
14 MOTOR
15 WALL
16 SPACE
17 PIPE
18 GAP
19A FIRST OPPOSITE END
19B SECOND OPPOSITE END
21 COVER
22 THERMO-VECTOR FLUID INLET
23 THERMO-VECTOR FLUID OUTLET
g GRAVITY DIRECTION

The invention claimed is:

1. A heat exchanger comprising:
a pressure vessel with an inlet for air, an outlet for air, and a bundle of first pipes housed within the pressure vessel for a thermo-vector fluid;
at least one gas/solid separator provided within the pressure vessel for separating particles drawn by the air;
a second pipe passing between the bundle of first pipes, the inlet being located at an end of the second pipe protruding outside of the pressure vessel;
wherein the at least one gas/solid separator is fixed to the second pipe.

2. The heat exchanger of claim 1, wherein the gas/solid separator is provided at an intermediate part of the pressure vessel.

3. The heat exchanger of claim 2, wherein the at least one gas/solid separator is also fixed to at least one wall of the pressure vessel.

4. The heat exchanger of claim 1, wherein the at least one gas/solid separator comprises a plurality of vanes.

5. The heat exchanger of claim 4, wherein the vanes are fixed vanes.

6. The heat exchanger of claim 4, wherein the vanes are configured to be rotating vanes.

7. The heat exchanger of claim 4, wherein the vanes are inclined towards a longitudinal axis of the pressure vessel.

8. The heat exchanger of claim 4, wherein the vanes are inclined with reference to a plane perpendicular to a longitudinal axis of the pressure vessel.

9. The heat exchanger of claim 1, wherein the at least one gas/solid separator is provided downstream the bundle of first pipes with reference to an air flow direction.

10. The heat exchanger of claim 1, wherein the at least one gas/solid separator is fixed to at least a wall of the pressure vessel.

11. The heat exchanger of claim 10, wherein the at least one gas/solid separator comprises a plurality of vanes and wherein the vanes are rotatable.

12. The heat exchanger of claim 10, wherein the at least one gas/solid separator comprises a plurality of vanes and wherein the vanes are fixed vanes.

13. The heat exchanger of claim 10, wherein the at least one gas/solid separator comprises a plurality of vanes and wherein the vanes are configured to be rotating vanes positioned within the pressure vessel.

14. The heat exchanger of claim 13, comprising:
a motor connected to the vanes.

15. The heat exchanger of claim 1, wherein the pressure vessel comprises:
a wall that defines a space located between the wall and a bottom of the pressure vessel, a gap being defined between the wall and the second pipe, the outlet being provided at the space.

16. A gas-turbine engine of a power plant, the gas-turbine engine comprising:
a compressor;
at least one combustion chamber; and
at least one turbine having a heat exchanger, the heat exchanger being the heat exchanger of claim 1.

* * * * *